June 13, 1933.   E. H. BICKLEY   1,914,322
DEVICE FOR THE COMPARISON OF COLORS
Filed Jan. 22, 1929

INVENTOR
Ernest H Bickley

Patented June 13, 1933

1,914,322

UNITED STATES PATENT OFFICE

EVERETT H. BICKLEY, OF CYNWYD, PENNSYLVANIA

DEVICE FOR THE COMPARISON OF COLORS

Application filed January 22, 1929. Serial No. 334,145.

This invention has to do with the art of matching colors in general, and more particularly, evaluating shades and tints by the comparison with a standard. A color mixed with black is called a shade, and mixed with white is called a tint. The determination of the hemoglobin content of blood by comparing the color with a standard, color analysis by comparing colors with a standard under various monochromatic lights, detection and estimation of impurities in liquids by comparison with a standard, the grading of cigars or other objects by comparison with a standard, the determination of mixtures of various colored substances by the comparison with a standard, and many other uses as will be apparent from the following description.

Heretofore there has been no simple and accurate device for determining the composition of a color, or comparing colors, or even compare two tints or shades of the same color without many chances of error or personal equation. My device, however, now makes it possible to compare tints or shades of a color, or different colors, to set up standards of color intensity which are definite, reliable, and independent of any device used in the apparatus. It eliminates the personal element, and makes it possible for a person who is color blind to make just as accurate color determinations as any other. The standards set up are easily made, rapidly duplicated, and reliable.

If a tint, color, or shade has some particular significance, such as the color of cigars, blood, precipitates, oils, condensates, etc., a special arbitrary standard may be set up with my device covering the special range of colors involved. The figures thus derived will then have a special significance to the user. In the mixing of paints, watercolors, pigments, dyes, stains, etc., the relative proportions may be quickly determined to get any color desired, by the use of my device.

To match a "print" composed of a number of colors, with a single plain color, my machine is very useful. My device will also indicate the effect of different colored lights on various colors and materials. By mixing any two ingredients (of different colors or reflectivity) in various proportions and using these mixtures to make a standard calibration disc, this disc may in turn be used to analyze any sample with my device, and make a quick determination of what proportions were used to make any mixture under question.

Having thus described the uses of my invention, the details of construction will now be described, referring to the accompanying drawing, wherein a numeral is used in all figures to represent the same part.

Figure 1:
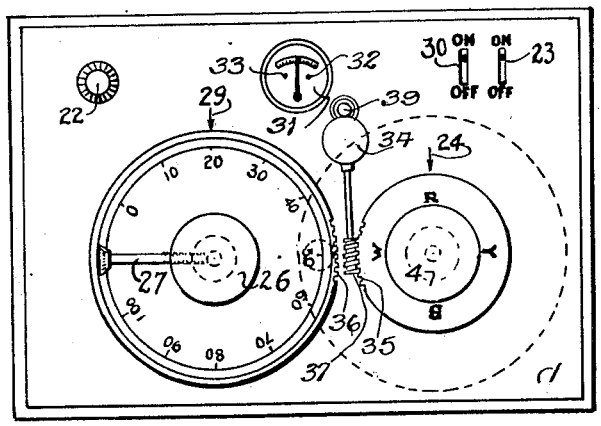
Figure 1 is a plan view of the device.

My device is all contained in a small case adapted to be easily transported, this case is light tight and is composed of the top 1, the front, back and sides 2, and the bottom 3. The entire interior is lined with a light absorbing medium preferably black velvet. The top 1 carries a color screen unit composed of a dial 4 lettered R Y B W to indicate red, yellow, blue, white, mounted on the shaft 5 with a color screen disc 6 attached to its lower end. This color screen unit is adapted to be manually rotated by means of the dial 4. The color screens are so positioned that when the letter R on the dial 4 is opposite the arrow 24 on the top 1 the red color screen 7 will lie in the path of the rays from the lamp 19 and the reflector 18. Likewise the other color screens are brought into play by properly adjusting the dial 4 bringing the indicating letters opposite the arrow 24. Altho any colors in the screens may be used I prefer to use the primary colors and white. These are indicated at 7, 8, 9 and 10 respectively, being red, yellow, blue and white. The color screens may be located in proximity with the photocell 16 if desired but to gain compactness I have located it as shown. A second dial assembly is mounted on the top 1 and is composed of the following parts,—

The dial 26 which is divided and numbered preferably 0 to 100, the calibration disc 11, the flanged pin 25 and the locking screw 27. A recess is provided in the top 1 to receive the lower end of the pin 25, thus positioning the dial 26 so that a portion of the edge of the calibration disc 11 covers the aperture 15 in the top 1. The calibration disc 11 fits snugly in a recess in the dial 26 and is held in place by the flange on the pin 25 which passes thru the calibration disc 11 into a socket in the dial 26, and is locked in this position by the knurled screw 27. This dial assembly may be lifted off the top 1 or replaced at will, and may be rotated so that any portion of the edge 12 13 or 14 of the calibration disc 11 may be brought over the aperture 15 at will. The electric lamp 19 is mounted in the light tight case 20 which is provided with a reflector 18 at the lower part, and an opening at the upper part, so constructed that the light from the lamp 19 is focused within the aperture 15, after passing thru the aperture 7 and color filter in the color screen disc 6 above mentioned. A photocell 16 is placed in a position adapted to receive light reflected from the calibration disc 11 or any other medium presented at the aperture 15. A thermionic valve 17 is located next to the photocell 16 to amplify the variations of current caused by the photocell 16 due to the changes in light intensity received from the medium presented at the aperture 15. The meter 31 located in the top 1 registers the current in the plate circuit of the thermionic valve 17. The battery 21 is provided to supply current to the various circuits in proper amounts.

The variable resistance 22 is conveniently located in the top 1 to provide the proper grid bias for the thermionic valve and the ionizing current for the photocell. The switches 23 and 30 provided in the top 1 are used to disconnect the current from the lamp, or lamp and thermionic valve as desired. A resistance 28 is provided to limit the current in the photocell 16 in case it is exposed to too great a voltage or light intensity or both. The arrows 24 and 29 are marked in the top 1 for reference in setting the dials 4 and 26 respectively. In order to adjust the amount of light received by the photocell for the purposes described elsewhere, the graduated slide 40 is provided, on which the base of the photocell 16 hooks. A spring 41 creates sufficient friction to hold the photocell in any desired position.

Figure 4:
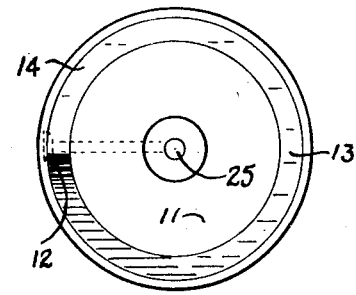
Figure 4 is a detail of the calibration disc underside, as used on the device.
Figure 2:
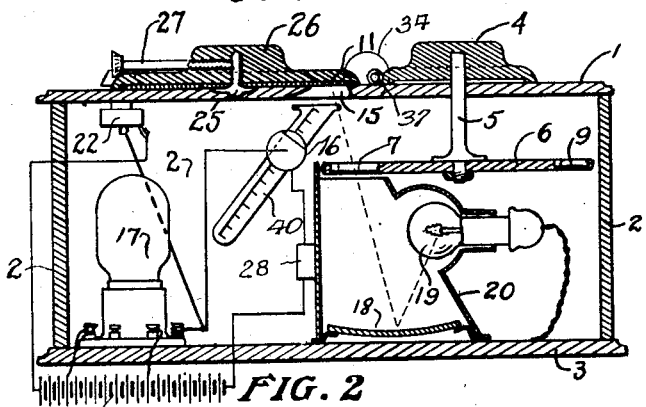
Figure 2 is an elevation from the front in part section with the front panel removed to show the internal parts.
Figure 5:
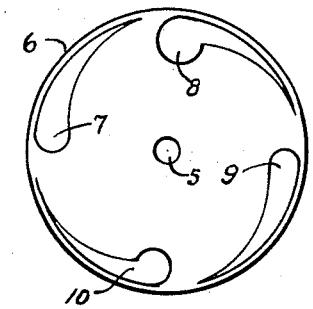
Figure 5 is a detail of the color screen disc.
Figure 3:
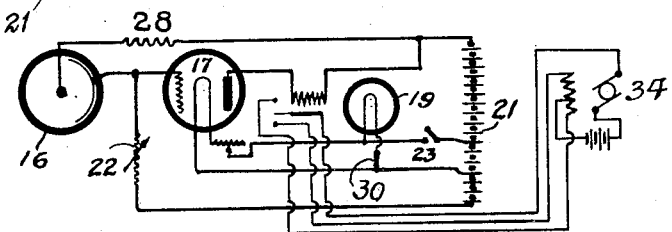
Figure 3 is a typical wiring diagram of the electrical connections used.
Figure 6:
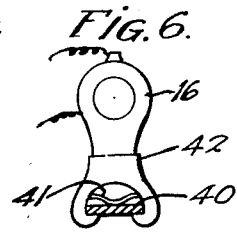
Figure 6 is a detail of the photocell with mounting.

I will now explain the method of using my device. The first step is to prepare the standard calibration discs, any number of which may be made depending upon the use to which it is to be put. For color analysis I use a disc which is black and white only. In Fig. 4 is shown such a disc. At the point 12 it is solid black in color, at 13 it is gray, or medium dark, at 14 it is white. At points between these it is varied in color gradually so that as one progresses from the point 12 to 14 there is a uniform and gradual whitening, corresponding to the percentages of white in the color at any point. When this calibration disc 11 is properly mounted in the dial 26 and placed on the top 1 the white portion of the disc will come at the aperture 15 when the arrow 29 points to 100% and the gray portion will come at the aperture 15 when the arrow 29 points at 50%, and the black portion 12 will register at the aperture 15 when the arrow 29 points to 0.

Instead of black and white, red and white, or red and black or any other colors, may be used in preparing the calibration disc 11 depending upon the use to which it is to be put.

Having prepared the black and white calibration disc 11, and adjusted it properly in the dial 26 the device is ready to analyze colors. For example I will describe the operations to analyze a single color. The method and manipulations will be the same for any other color. Suppose we have a sample of brown cloth and it is desired to know the color analysis. We first turn on switches 23 and 30, thus lighting the filaments in the lamp and thermionic valve. We remove dial 26 and apply the sample of cloth to the aperture 15. Dial 4 is next adjusted so that the red color screen 7 is in the path of the rays of light from the lamp 19. By manipulating the dial 4 back and forth slightly a greater or lesser portion of the red rays of light will pass thru the aperture 7 due to the "comet" shape hole in the filter which contains the red color screen. This will cause the photocell 16 to be affected to a greater or lesser degree which in turn will cause the thermionic valve 17 to pass a greater or lesser current thru the meter 31 thus causing the needle on the meter 31 to swing back and forth depending on how the dial 4 is manipulated. The dial 4 however is adjusted to such a position that the needle of the meter 31 is exactly central. The sample of brown cloth is now removed from the aperture 15 and the disc 26 is applied with the center pin 25 in the recess in the top 1 above mentioned. The disc 26 is now manually rotated and adjusted to a position such that the needle in the meter 31 again comes to rest exactly in the central position as before. A reading is now taken from the divisions on the disc 26 opposite the arrow 29. In this case we find it to be 53%. This is the reflectivity of the sample to the wave length of light corresponding to red color.

We now adjust dial 4 so that filter 8 (yellow) is intercepting the rays from lamp 19 by turning the dial 4 so that the letter "Y" is opposite the arrow 24, and apply the brown cloth to the aperture 15 again. We now adjust dial 4 again to vary the light until the needle of the meter 31 is exactly central. The cloth is now removed and the dial 26 is substituted over the aperture 15 and adjusted until the needle of meter 31 is central and a reading again taken. In this case it is 45%. This indicates a reflectivity of 45% to rays having a wave length corresponding to yellow light. We now repeat the manipulations with the blue filter 9 and find the disc 26 reads 34% when the meter 31 comes to rest central. We now have the color of brown cloth analyzed as red 53% yellow 45% blue 34%. To one not familiar with color analysis, these percentages are interpreted as follows. An examination shows 34% to be included in each color, and since 34% of red plus 34% yellow plus 34% of blue will give 34% of white, with 11% yellow left over and 19% red left over. 11% of yellow and 11% of red gives 11% of orange, and 8% of red left over. Since we know that 50% white is a halftone of gray 34% white will be darker than a halftone, and mixing in orange to the extent of 11% with 8% of red will give a "warm brown color." Since photocells available at the present time are unequally sensitive to the various colors, the apertures 7, 8, 9, and 10 in the color screen disc 6 are made of various sizes to compensate to some extent for this variation in sensitivity, to save adjustment of the resistance 22; in case difficulty is encountered due to low voltage, aging of the photocell, dark colors, etc., it may be necessary to adjust the resistance 22 so that the thermionic valve is more sensitive to get sufficient deflection of the needle of the meter 31.

My device does not depend upon any particular photocell for operation, nor its relative sensitivity to colors provided it is sensitive enough to give a deflection in the meter, nor does it depend on light intensity, voltage, meter calibration, or other unreliable factors, but depends only on the filters and the standard calibration discs which are easily made, are constant in use and readily duplicated. To use the device to grade cigars into 100 grades of color all that is required is to color a standard calibration disc so that the color of the darkest cigar is matched when the disc 26 reads 0% and the lightest cigar is matched when the disc reads 100% and the colors intermediate are varied as desired between these two extremes. By applying cigars to the aperture 15 the device will then grade cigars into uniform colors with 100 grades.

To use the device to determine hemoglobin in the blood it is necessary to make a standard calibration disc colored to match the color of freshly drawn normal blood absorbed in filter paper as 100% and varying in color down to a straw color representing 0% hemoglobin. Having prepared the standard calibration disc for hemoglobin, the test is made by applying a sample of freshly drawn blood on filter paper to the aperture 15 and adjusting dial 4 preferably with white light to bring the needle of the meter 31 exactly central. The dial 26 carrying the standard calibration disc for hemoglobin is now applied to the aperture 15 and the dial is adjusted so that the needle of the meter 31 is again exactly central. A reading is now taken on the dial 26 which gives directly the hemoglobin content in percentage, of the sample under test.

The resistance 22 may be varied in lieu of the adjustment of the color screen disc 6 to vary the light intensity, or the lamp 19 may be turned up or down with a rheostat, to bring the needle of the meter 31 central, or the photocell may be moved nearer or farther away from the aperture by sliding the photocell 16 along the graduated slide 40 so that the amount of light entering the photocell 16 is thereby varied. The distance being moved may be used as a check on the accuracy of any calibration disc 11 or a color determination, by the use of the inverse square law of light dispersion. Or any other means may be employed to vary the conditions without departing from the scope of my invention. It is not always necessary or desirable to operate the device with the needle of the meter in a central position, but any other position may be used except the extreme limits of the needle's motion, it is simply necessary to make a mental note of the position of the needle in many cases and then bring it back to this position by adjusting the dial 26 before taking a reading.

As described, the disc 26 is adapted for opaque objects, but it may be used equally well for transparent objects, by making the disc of glass or other transparent material, and coloring the standard calibration disc with translucent or transparent colors, on a transparent or translucent backing. The lamp 19 in this case is extinguished, by opening the switch 30 and device is placed so that daylight or artificial light falls on the object placed over the aperture 15. When used in this way the device will compare stained glass, ray filters, lenses, and like objects, as well as detect the presence of impurities or foreign matter in materials or containers without opening or damaging the same. It will indicate the presence of cracks, flaws or air pockets in translucent materials or objects.

To make the operation of my device more automatic, use is made of the removable contacts 32 and 33 on the meter 31 to operate a motor 34. This motor is adapted to run forward or backward depending upon which contact the needle on the meter 31 touches. The motor 34 is mounted on the top of the case 1 on a swinging joint 39, adapted to permit engagement of the worm 37 on the extended shaft of the motor 34 with the worm teeth 36 cut in the edge of the dial 26 or the worm teeth 37 cut in the edge of the dial 4, thereby rotating either of these dials automatically as desired. The motor 34 is so connected that its direction of rotation tends to rotate the dials so that the meter comes to rest in a neutral position between the contacts 32 and 33. Wherever the word "color" is used in this application, it is meant to include not only single wave lengths of light but also any mixtures of wave lengths of visible or invisible light.

Having thus described my invention what I claim is:

1. In a color analysis device, a color intensity indicator, in combination with means for controlling the wave length and intensity of light applied to said indicator, means for adjusting the sensitivity of said indicator, a reflective standard and means for indicating said standard substantially as described.

2. In a color analysis device, a color intensity indicator, in combination with means for controlling the wave length and intensity of light applied to said indicator, means for adjusting the sensitivity of said indicator, an absorptive standard and means for indicating said standard substantially as described.

3. In a color comparison device, means for illuminating objects to be compared, one of said objects being a variable color density standard, a light sensitive system adapted to respond to light reflected from said objects, and means for controlling the wave length of the light received by the light sensitive system substantially as described.

4. In a color comparison device, a source of illumination and an adjustable light sensitive indicator in combination with a calibrated color standard adapted to reflect light from said source of illumination to said light sensitive indicator and means for varying the color of the light reaching the said light sensitive indicator.

5. Same as claim 4 together with means for varying the light intensity reaching said indicator.

6. In a color comparison device, a source of illumination and a light sensitive indicator in combination with a variable color standard adapted to reflect light from said source of illumination to said indicator means for varying the wavelength of light reaching said indicator and means for varying the intensity of the illumination reaching the said indicator together with means responsive to said indicator for varying the said color standard or intensity of illumination.

7. A color comparison device comprising a case, a variable color standard adapted to fit over a window in said case, a photoelectric cell adapted to receive light from said window on a slide for varying the position of said photoelectric cell with reference to said window within said case, means for amplifying and indicating signals received from said photoelectric cell, color filters and shutters associated with a source of illumination within said case adapted to control the color and intensity of light available for reflection from objects applied to said window to said photoelectric cell, for the purpose described.

8. Same as claim 7 together with motor operated by said amplifying and indicating means to vary said color standard and color filters and shutters.

9. In a color analysis device, in combination a calibrated color intensity member cooperatively associated with a light intensity indicator and means for progressively presenting light from the calibrated color intensity member to the said indicator.

10. In a color analysis device, in combination, a calibrated color intensity member, cooperatively associated with a light intensity indicator and means for progressively presenting light from the calibrated color intensity member to the said indicator, and means for controlling the wave length characteristics of the applied light.

11. In a color analysis device, in combination, a calibrated color intensity member cooperatively associated with a light intensity indicator, means for presenting light from any point of said color intensity member to said light intensity indicator, and means for adjusting the distance between the calibrated color intensity member and the intensity indicator.

12. In a color analysis device, in combination, a calibrated intensity member and a calibrated wave length member cooperatively associated with a light intensity indicator, and means for presenting light to said intensity indicator from any point of said color intensity member and said wave length member.

13. In a color analysis device, in combination, a graduated intensity black and white reflecting member, a light source, means for varying the color of the light from said source, means for selectively illuminating portions of said reflecting member with light from said source and a light sensitive indicator responsive to light from said reflecting member.

14. In a color analysis device, in combination a graduated intensity black and white reflecting member, a light source, means for selectively illuminating portions of said reflecting member with light from said source, a light sensitive indicator responsive to light from said reflecting member and means for varying the color and intensity of said light received by said sensitive indicator.

EVERETT H. BICKLEY.